July 8, 1952 — J. A. MOOSMAN — 2,602,331
FLUID PRESSURE RECORDER
Filed Sept. 22, 1947 — 2 SHEETS—SHEET 1

Inventor
JACK A. MOOSMAN.
By James M. Abbott

July 8, 1952 — J. A. MOOSMAN — 2,602,331
FLUID PRESSURE RECORDER
Filed Sept. 22, 1947 — 2 SHEETS—SHEET 2

Inventor
JACK A. MOOSMAN.
By James M. Abbett
Attorney

Patented July 8, 1952

2,602,331

UNITED STATES PATENT OFFICE 2,602,331

FLUID PRESSURE RECORDER

Jack A. Moosman, Los Angeles, Calif., assignor, by mesne assignments, to Johnston Testers, Inc., Houston, Tex., a corporation of Delaware Application September 22, 1947, Serial No. 775,452

14 Claims. (Cl. 73—300)

This invention relates to oil well drilling equipment and particularly pertains to a fluid pressure recorder.

In oil well drilling operations at present it is common practice to measure and record the pressure of fluid at the bottom of a well bore. This operation is usually done in conjunction with a formation test, a casing test, or a water shut-off test. These tests are performed by the use of a testing tool which is set at an appropriate level in the well casing or the well bore to pack off a zone below the tester and to support the hydrostatic head of fluid above the tester so that a sample of fluid may be obtained from the testing area and without having the hydrostatic head of fluid imposed thereupon. Pressure recording instruments are usually attached at the lower end of the tester so that they will respond to the formation pressure and will also indicate whether or not the testing device has functioned properly. In view of the fact that oil wells are now being drilled to a depth of three miles or more, it is obvious that the pressure bomb at the lower end of the tester might at points along its course into the well strike against the side walls of the casing or formation and that delicate recording mechanism might be damaged. It has also been common practice in some types of pressure recording devices to provide a reciprocating plunger which must operate through a packing gland. It has been found in operation that such packing members gradually lose their efficiency with each testing operation so that the recordings will not be uniform and accurate. It is the principal object of the present invention, therefore, to provide a fluid pressure recording instrument of the character described which will be rugged in construction so that it can withstand rough usage while being lowered into the well bore and withdrawn therefrom, and it is also an object of the present invention to provide a structure in association with the novel recording device which will insure accurate and uniform operation of the tool at all times and after repeated operation.

The present invention contemplates the provision of a pressure recording structure having an outer housing within which a recording chart is supported and is driven by a suitable clock mechanism, the chart operating in conjunction with a stylus which is moved by direct mechanical operation in response to pressure of fluid confined within the recording instrument, the device being fitted with a fluid responsive means for operating the stylus which does not require the use of packing and will operate uniformly and accurately.

The invention is illustrated by way of example in the accompanying drawings in which.

Figure 1:
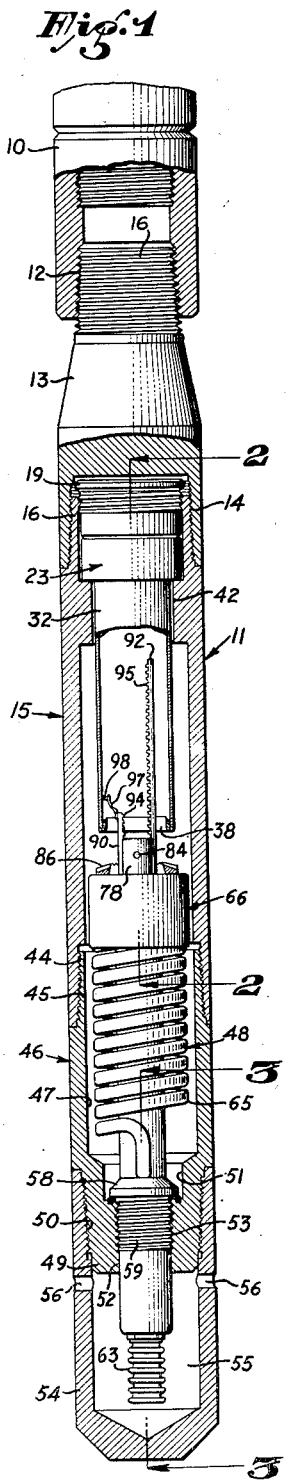
Figure 1 is a view in central longitudinal section showing the construction of the pressure recording device.
Figure 4:
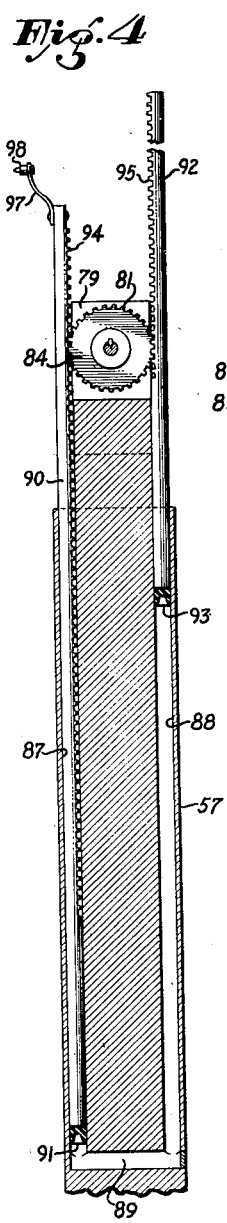
Fig. 4 is a view in transverse section through the mandrel of the recording device showing the counterbalancing fluid conduits.

Referring more particularly to the drawings, 10 indicates a supporting string of pipe or a collar by which a pressure recording device 11 may be suspended in a well or supported from the lower end of a testing tool within a well. The member 10 is internally threaded to receive a threaded portion 12 of a sub 13 which is enlarged at its lower end and has an internal threaded bore 14 therein. A cylindrical upper housing section 15 is disposed below the sub 13 and has a tubular threaded extension 16 which extends into the bore 14. The tubular threaded extension 16 is formed with a counterbore 17 at its upper end and is internally threaded at 18 to receive a lock sleeve 19. The lower end of the counterbore 17 is provided with a shoulder 22. A bearing ring 23 rests on this shoulder and fits within the counterbore 17. The ring has a cylindrical side wall portion 24 against the upper end of which the lock sleeve 19 abuts. The lower end of the ring has a face 25 which seats against the face 22 of the counterbore. The lower end of the ring is also formed with an inwardly extending annular flange 26. A counterbore 27 is formed in the ring 23 and is closed at its lower end by the flange 26. An outer anti-friction ball race 28 is seated within this counterbore and rests against the flange. Ball bearings 29 are interposed between the outer ball race 28 and an inner ball race 30. The inner ball race is mounted around a cylindrical extension 31 formed on the end of a tubular cylindrical chart receiving cylinder 32. This cylinder is longitudinally aligned within the upper housing section 15 and rotates around the axis thereof. A nut 33 holds the inner ball race 30 in position. Interposed between the end of the member 32 and the sub 13 is a clock mechanism 34. A suitable driving connection 35 is provided between the drive spindle of the clock and the chart cylinder 32. Sealing washers 36 and 37 are interposed between faces of the end of the chart cylinder 32 and the contiguous faces of the ring 23. The chart cylinder 32 has an inturned end flange 38 at its lower end. This flange is formed with an undercut groove, as indicated at 39. An undercut groove 40 is formed at the opposite end of the cylinder and a chart sheet 41 may be inserted within the cylinder to be held temporarily at its opposite ends within the grooves 39 and 40. The lower end of the cylinder is thus open so that the chart may be inserted or removed. The cylinder extends downwardly within a central bore 42 which communicates with a relatively large bore 43 formed within the upper housing section 15. At the lower end of the housing section 15 is a threaded counterbore 44. This receives the upper tubular threaded end 45 of a lower housing section 46. The lower housing section 46 has a central bore 47 agreeing substantially in diameter with the bore 43 and accommodates a pressure responsive stylus operating unit 48. The lower end of the housing section 46 is formed with a tubular extension 49 of reduced outside diameter, which portion is externally threaded as indicated at 50. The bore 47 of the lower housing section 46 is reduced in diameter at its lower end as indicated at 51. A further reduction in diameter of the bore is indicated at 52. This last mentioned bore is internally threaded at 53 and has a smooth bore portion at its outer end. Mounted upon the external threaded portion 50 of the lower housing section 46 is a cap 54 which extends downwardly and is closed at its lower end to form a fluid chamber 55. This chamber communicates with the well bore through side wall ports 56.

Figure 5:
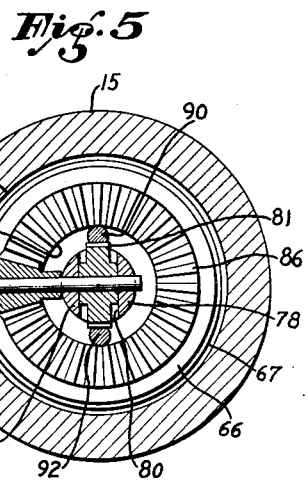
Fig. 5 is a sectional view along the line 5—5 of Fig. 2 showing the gearing arrangement.
Figure 6:
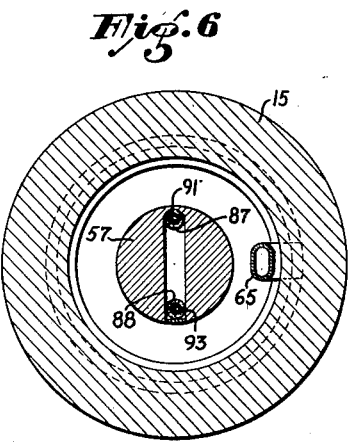
Fig. 6 is a sectional view along the line 6—6 of Fig. 3.
Figure 2:
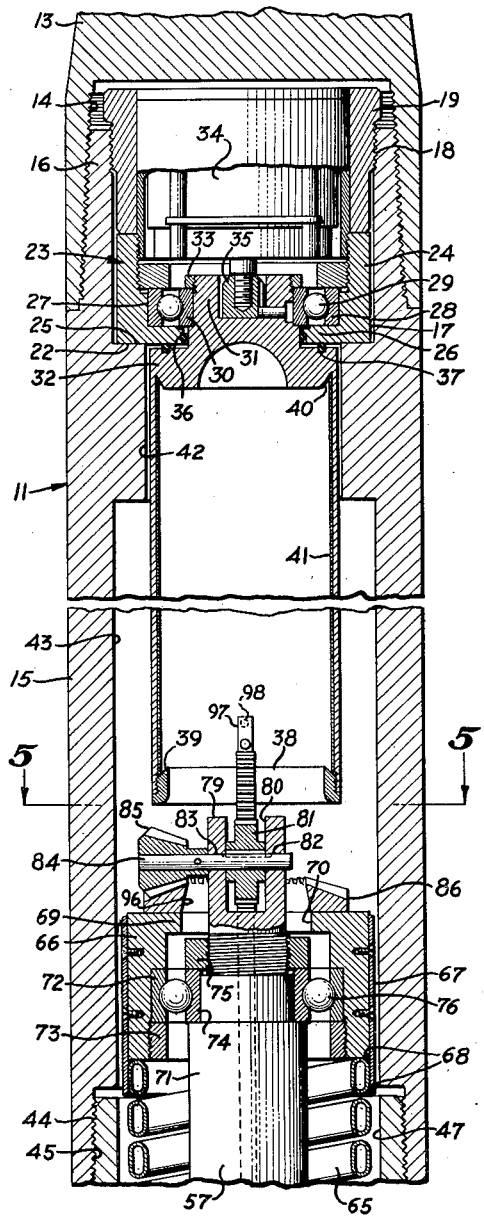
Fig. 2 is a view through the recording device as seen on the line 2—2 of Fig. 1 and shows the rack operating mechanism.
Figure 3:
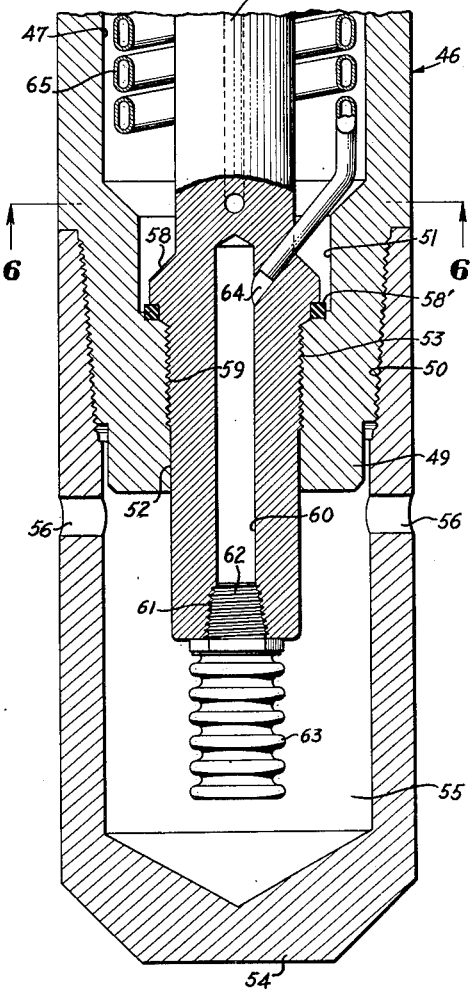
Fig. 3 is a view in transverse section through the recording device as seen on the line 3—3 of Fig. 1 and shows the connection between the Bourdon tube and the bellows.

The fluid pressure stylus operating unit 48 comprises a central mandrel 57. This mandrel is formed intermediate its length with an annular collar 58 which is positioned within the bore 51 and rests against a sealing ring 58' at the lower end of this bore. The portion of the mandrel 57 below the collar 58 is cylindrical and is externally threaded at 59 to engage the threads 53 within the bore 52. The portion 58 extends downwardly for a distance below the end of the lower housing section 46. A central fluid duct 60 extends upwardly through the portion 58 of the mandrel 57 and is formed at its lower end with a threaded counterbore 61 to receive a threaded extension 62 carrying a Sylphon bellows 63. The bellows 63 is disposed within the chamber 55 formed by the cap 54. The lower end of the central duct 60 communicates with the Sylphon bellows 63. The upper end of the duct is provided with a lateral passageway 64 which communicates with a helical tube 65 of the Bourdon type. Such a tube will tend to uncoil when fluid pressure is imposed within it. The lower end of the tube is anchored to the mandrel. The upper end of the tube is secured to a rotating cap 66. The cap 66 is substantially of the outside diameter of the tube 65 and carries an outer sleeve 67 to which the upper free end of the tube 65 is secured in some suitable manner, such as by welding, as indicated at 68. The upper end of the cap 66 has an inturned flange 69 formed with a central opening 70 through which an upper portion 71 of the mandrel 57 extends. An outer ball race 72 is seated within the cap 66 and is held by a nut 73. An inner ball race 74 is mounted upon the mandrel and is held in position by a nut 75. Bearing balls 76 are interposed between the ball races 72 and 74. Thus, the cap 66 is supported upon an anti-friction bearing structure and may rotate freely as the fluid responsive helix 65 coils and uncoils. Extending upwardly through the cap 66 and formed as a part of the mandrel 57 is a pair of bearing standards 78 and 79. The members 78 and 79 represent segments of a circle, as shown in Fig. 5, and have a space 80 between them to accommodate a gear pinion 81. The bearing members 78 and 79 have aligned bores 82 and 83 through them with a common axis in a plane normal to the longitudinal center of the mandrel. These bores accommodate a shaft 84 upon which the gear 81 is mounted. The shaft extends outwardly from the bearing member 79 and receives a bevel gear 85. This gear is in mesh with a bevel gear 86 which is fixed to the end 69 of the cap 66 and imparts rotation to the bevel gear pinion 85.

Formed longitudinally within the upper section 71 of the mandrel 57 are parallel cylindrical bores 87 and 88. These bores are here shown as spaced equidistant from the longitudinal center of the mandrel and communicate through a passageway 89 at their lower ends. In one of the bores a thrust rod 90 is positioned for reciprocating movement. The lower end of the rod is fitted with a packing cup 91. The bore 88 is designed to receive a counterbalancing rod 92 which reciprocates longitudinally of the bore and is fitted at its lower end with a cup 93. The inner face of the thrust rod 90 is formed with teeth providing a gear rack 94 which meshes with the spur gear pinion 81. The counterbalance rod 92 is formed with teeth on its inner face providing a gear rack 95 which meshes with the teeth of the pinion 81 upon the diametrically opposite side from the point at which the gear rack 94 meshes with the pinion. Thus, as the thrust rod 90 moves in one direction the counterbalance rod 92 will move in a counter-direction, since the space within the bores 87 and 88 beneath the packing cups 91 and 93 is filled with an incompressible fluid. The rods 90 and 92 extend upwardly through a passageway 96 in the center of the gear 86. Carried on the free end of the thrust rod 90 is a yieldable finger 97. At the free end of this finger is a stylus 98 which bears against the surface of the chart 41 and inscribes a continuous mark on the chart as the recording instrument functions.

In operation of the present invention the pressure recording instrument is assembled as shown in the drawings with a chart sheet 41 disposed around and against the inner cylindrical surface of the chart cylinder 32 and with the stylus 98 resting against the chart. At this time the clock mechanism 34 is released so that it will rotate the chart cylinder 32. After the structure is thus assembled it is attached to a string of pipe or to the lower end of a testing tool and is lowered into the well. As the cap 54 is submerged within the drilling fluid with which the well bore is filled the fluid will flow into the chamber 55 through the ports 56 and envelope the Sylphon bellows structure 63. Attention is directed to the fact that by the use of the Bourdon tube a rugged and reliable recording structure is provided which eliminates packing and which insures that the recording operation will be accomplished with consistent accuracy. This insures that the instrument in its entirety, including the Sylphon bellows 63, may be used repeatedly without affecting the accuracy of the recording structure of the instrument. This desirable result is not obtainable in most recording instruments in which a plunger must reciprocate through a tight packing gland. In such instances it has been found that the packing becomes loose and lacking in resiliency on successive runs of the tool, thus causing the balance of pressure between the incompressible fluid within the bore 60 and the well fluid surrounding the Sylphon bellows 63 to have a slightly different balance in value. This will cause the recordings to become more and more inaccurate on successive runs, and will necessitate frequent change of packing in an effort to insure accurate readings. In fact, drilling operators often insist that two pressure recording devices be run simultaneously, one mounted above the other so that any variation in recordings between the two recording instruments may be detected.

It is to be understood that while the counterbalance rod 92 has been described as being formed with a gear rack 95 to engage the teeth of the pinion 91 that this construction may be varied. For example, if desired the counterbalance rod 92 and the bore 88 within which it reciprocates may be offset from the center of the tool so that the rod will clear the pinion. In this particular construction the weight of the rod 92 will act against the fluid contained within the bores 87 and 88 and the transverse passageway 89 and will tend to hold the rack 94 of rod 90 firmly against the pinion teeth at all times. It is to be understood that the helical tube 65, the bore 60, and the Sylphon bellows 63, are completely filled with an incompressible fluid so that when the Sylphon bellows is deformed, either by compression or expansion, a pressure response will take place within the helical tube 65. When the Sylphon bellows 63 is compressed the fluid pressure will be increased within the Bourdon tube 65 and this will act the same as all other Bourdon type tubes, tending to cause the tube to uncoil or expand in diameter. In the present instance the tube 65 is cylindrical and helical in shape with its lower end fixed relative to the mandrel 57. The upper end is fixed to the cap 66 and is confined within the sleeve 67. It is thus impossible for the helical tube 65 to increase in diameter and it must therefore tend to uncoil. As this takes place the cap 66 will rotate and will thus impart rotation to the bevel gear 86. As the bevel gear rotates it will drive the bevel pinion 85 and rotate the gear shaft 84. This will cause simultaneous rotation of the gear pinion 81 and will appropriately move the thrust rod 90 and the stylus 93. As the thrust rod 90 moves upwardly the styus will inscribe a line upon the chart 41. At this same time the pinion 81 will cause the counterbalance rod 92 to move downwardly. The opposite movement of the rods will be cushioned by an intermediate amount of fluid which fills the portion of the bores 87 and 88 and the communicating passageway 89 between the cups 91 and 93 carried by the rods 90 and 92. When the recording instrument has been withdrawn from the well the sub 13 may be unscrewed from the top of the upper housing section 15, thus permitting the nut 19 to be unscrewed and then allowing the clock 34 and the chart cylinder 32 to be withdrawn from the upper housing section. The chart may then be removed with its record. A new chart may then be placed within the cylinder so that the tool may be reassembled and will be ready for use.

It will thus be seen that the recording instrument here disclosed does not involve the use of any delicate mechanism but that all of the parts of the mechanism are rugged in construction and will withstand the necessary shock and abuse to which a recording instrument is subjected when it is run into and withdrawn from the well bore.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. A fluid pressure recording device adapted to be lowered into oil wells, which comprises a tubular housing adapted to be suspended in a well and submerged in the fluid of the well, a cap on the lower end of the housing having ports through which the fluid of the well may enter, a mandrel mounted on the lower end of said housing and above said cap, a fluid passageway extending longitudinally of the lower end of the mandrel and into the chamber formed by the cap, a flexible element secured at the lower end of the mandrel and separating said chamber from the passageway, a tubular helical element circumscribing the mandrel and in communication at its lower end with the passageway and being closed at its upper end, a cap rotatably mounted on the upper end of the mandrel and to which the closed end of the helical tube is secured, a gear pinion carried at the upper end of the mandrel, a rack in mesh therewith and supported for longitudinal movement of the mandrel, a stylus carried by the upper end of the rack, gear means between the cap on the upper end of the mandrel and the gear pinion whereby rotation of the cap will impart rotation to the pinion, a tubular chart cylinder open at its lower end to receive a chart sheet and the stylus, means rotatably supporting the cylinder at its upper end, and a clock mechanism connected with the upper end of the cylinder to rotate the same.

2. A fluid pressure recorder comprising a tubular housing formed with an upper housing section and a lower housing section, a cap on the lower housing section and forming a fluid chamber, ports through the wall of said fluid chamber establishing communication with the well fluid, a mandrel closing the lower end of said lower section, a fluid passageway within the mandrel, a flexible diaphragm closing the lower end of said passageway and being responsive to the pressure of the well fluid, a cap rotatably mounted upon the upper end of the mandrel, a tubular helical fluid responsive element disposed around the mandrel, its upper end being closed and fixed to the cap, its lower end being anchored to the mandrel and communicating with the fluid passageway therein, said tubular element and fluid passageway being filled with an incompressible fluid, a pair of parallel longitudinal bores extending downwardly from the upper end of the mandrel and communicating wtih each other at their lower ends, a fluid-sealed counterweight rod disposed in one of said bores, a fluid-sealed thrust rod disposed within the other of said bores, the bore between the ends of said rods being filled with an incompressible fluid, a gear rack carried by each rod, a stylus carried at the upper end of one rod, a gear pinion rotatably supported at the upper end of the mandrel and with which said racks mesh, gearing between said pinion and the cap on the mandrel for imparting rotation from the cap to the pinion, and a chart-carrying recording mechanism mounted in the upper end of the housing and with which said stylus cooperates in inscribing a recording line.

3. A pressure recording device adapted to be submerged in the fluid within a well, comprising an upper tubular housing section, a lower tubular housing section threaded thereto, a cap on the lower tubular housing section and forming a fluid chamber, passageways through the walls of said cap, a mandrel within the lower housing section means providing a passageway disposed centrally of the mandrel, a Sylphon bellows to connect with the passageway and being positioned within the fluid chamber, a tubular helical fluid responsive element fixed to the mandrel and communicating with the passageway, a cap through which the upper end of the mandrel extends, said cap being secured to the upper closed end of the tubular helical member, anti-friction bearing means rotatably supporting the cap upon the mandrel, a bevel gear secured to the end of the cap and concentrically thereof, a shaft rotatably supported by the mandrel above the bevel gear, a bevel pinion carried by the shaft meshing with the bevel gear, a spur pinion carried by the shaft disposed in the plane of the central axis of the mandrel, a thrust rod supported for longitudinal movement by the mandrel and parallel to the central axis thereof, a gear rack carried by said thrust rod and meshing with the spur pinion whereby rotation of the spur pinion will reciprocate the rod, a stylus carried at the upper end of the thrust rod, a tubular chart-carrying cylinder within the upper housing section and into which the upper end of the thrust rod and the stylus extend, anti-friction bearing means rotatably supporting the upper end of the cylinder, and a clock mechanism mounted within the upper end of the upper housing section for driving the chart cylinder.

4. A fluid pressure recording device adapted to be lowered into oil wells, which comprises a tubular housing adapted to be submerged in the fluid of the well, a cap on the lower end of the housing having ports through which oil well fluid may enter, a mandrel mounted within said housing above said cap, a fluid passageway extending longitudinally of the mandrel, a flexible pressure responsive element within said cap and subject to the pressure of the oil well fluid, means establishing communication between said element and said passageway, a tubular helical element circumscribing the mandrel and in communication with the passageway at one end and closed at the other end, a rotatable cap carried by said mandrel and engaging said helical element to be rotated thereby, a gear pinion carried at the upper end of the mandrel, means for imparting motion from the rotatable cap to the gear pinion, a rack in mesh with the pinion and supported for longitudinal movement of the mandrel, a stylus carried by the upper end of the rack, and a clock operated chart-carrying cylinder adapted to rotate around the central axis of the housing and with relation to which the stylus moves longitudinally.

5. A device of the class described adapted to be lowered into a well comprising, a housing, means in the housing for converting rotary movement into rectilinear movement, a helical Bourdon tube fixed at its lower end to the housing and connected at its upper end to said means and responsive to pressure in the well to create and transmit a rotary movement to said means, a stylus connected to said means to be moved rectilinearly thereby when said helical tube transmits rotary movement to said means, a tubular chart carrier associated with the stylus, and means for rotating the chart carrier.

6. A device of the class described adapted to be lowered into a well comprising, a housing, means in the housing for converting rotary movement into rectilinear movement, a helical Bourdon tube fixed at its lower end to the housing and connected at its upper end to said means, a bellows subjected to the fluid in the well and having the interior in communication with the interior of the tube for causing rotary movement of the tube in accordance with changes in well pressure, a stylus connected to said means to be moved rectilinearly thereby when said helical tube transmits rotary movement to said means, a tubular chart carrier associated with the stylus, and means for rotating the chart carrier.

7. A device of the class described adapted to be lowered into a well comprising, a housing, means in the housing for converting rotary movement into rectilinear movement, a helical Bourdon tube fixed at its lower end to the housing and connected at its upper end to said means, a bellows subjected to the fluid pressure in the well and having the interior in communication with the interior of the tube, an incompressible fluid medium in the bellows and tube whereby motion of the bellows is communicated to the tube to cause the creation of a rotary movement, a stylus connected to said means to be moved rectilinearly thereby when said helical tube transmits rotary movement to said means, a tubular chart carrier associated with the stylus, and means for rotating the chart carrier.

8. A device of the class described adapted to be lowered into a well comprising, an elongated housing, means in said housing for converting rotary movement into rectilinear movement, a helical Bourdon tube within said housing fixed at its lower end to said housing and at its upper end to said means and responsive to pressure in the well to create and transmit a rotary movement to said means, a stylus connected to said means to be moved rectilinearly thereby when said helical tube transmits rotary movement to said means, a tubular chart carrier associated with the stylus and located above said means, and means for rotating the chart carrier.

9. A device of the class described adapted to be lowered into a well comprising, a housing, means in the housing for converting rotary movement into rectilinear movement, a helical Bourdon tube fixed at its lower end to the housing and connected at its upper end to said means and responsive to pressure in the well to create and transmit a rotary movement to said means, said means including gearing driven by said tube and a rack driven by the gearing to be moved rectilinearly when said tube rotates, a stylus on the rack, a tubular chart carrier associated with the stylus, and means for rotating the chart carrier.

10. A device of the class described adapted to be lowered into a well comprising, a housing, means in the housing for converting rotary movement into rectilinear movement, a helical Bourdon tube fixed at its lower end to the housing and connected at its upper end to said means and responsive to pressure in the well to create and transmit a rotary movement to said means, said means including gearing driven by said tube and a rack driven by the gearing to be moved rectilinearly when said Bourdon tube imparts rotary movement to said means, a counterbalance member, means providing a passageway into the opposite ends of which the rack and counterbalance member fit, sealing means on said rack and counterbalance member to effect seals between the interior of the passageway and the rack and counterbalance member, and a fluid medium in the passageway and between the rack and counterbalance member to transmit motion therebetween; a stylus on the rack, a tubular chart carrier associated with the stylus, and means for rotating the chart carrier.

11. A device of the class described adapted to be lowered into a well comprising, a housing, means in the housing for converting rotary movement into rectilinear movement, a helical Bourdon tube fixed at its lower end to the housing and connected at its upper end to said means and responsive to pressure in the well to create and transmit a rotary movement to said means, said means including gearing driven by said tube and a rack driven by the gearing to be moved rectilinearly when said Bourdon tube transmits rotary movement to said means, and means for counterbalancing the weight of the rack; a stylus on the rack, a tubular chart carrier associated with the stylus, and means for rotating the chart carrier.

12. A device of the class described adapted to be lowered into a well comprising, an elongated housing, means in said housing for converting rotary movement into rectilinear movement, a helical Bourdon tube within said housing and fixed at its lower end to said housing and at its upper end to said means and responsive to pressure in the well to create and transmit a rotary movement to said means, said means including gearing driven by said tube and a rack driven by the gearing to be moved rectilinearly when the Bourdon tube transmits rotary movement to said means, and means for counterbalancing the weight of the rack; a stylus on the rack, a tubular chart carrier associated with the stylus and located above the first-named means, and means for rotating the chart carrier.

13. A device of the class described adapted to be lowered into a well comprising, an elongated housing, means in said housing for converting rotary movement into rectilinear movement, a helical Bourdon tube within said housing and fixed at its lower end to said housing and at its upper end to said means and responsive to pressure in the well to create and transmit a rotary movement to said means, said means including gearing driven by said tube and a rack driven by the gearing to be moved rectilinearly when the Bourdon tube transmits rotary movement to said means, and means for counterbalancing the weight of the rack; a stylus on the rack, a tubular chart carrier associated with the stylus and located above the first-named means, means for rotating the chart carrier, a bellows carried by the housing and subjected to the pressure in the well, and means providing a passageway connecting the bellows to the tube whereby motion of the bellows can be effective on the Bourdon tube to cause the creation of rotary movement.

14. A device of the class described adapted to be lowered into a well comprising, an elongated housing, means in said housing for converting rotary movement into rectilinear movement, a helical Bourdon tube within said housing and fixed at its lower end to said housing and at its upper end to said means and responsive to pressure in the well to create and transmit a rotary movement to said means, said means including gearing driven by said tube and a rack driven by the gearing to be moved rectilinearly when the Bourdon tube transmits rotary movement to said means, and means for counterbalancing the weight of the rack; a stylus on the rack, a tubular chart carrier associated with the stylus and located above the first-named means, means for rotating the chart carrier, a bellows carried by the housing and subjected to the pressure in the well, means providing a passageway connecting the bellows to the Bourdon tube, and an incompressible fluid medium in the Bourdon tube, the bellows and the passageway adapting the bellows to cause actuation of the Bourdon tube.

JACK A. MOOSMAN.

REFERENCES CITED

The following references are of record in the file of this patent:

UNITED STATES PATENTS

| Number | Name | Date |
| --- | --- | --- |
| 817,907 | Feist | Apr. 17, 1906 |
| 1,150,153 | Strauss | Aug. 17, 1915 |
| 1,565,447 | Heise | Dec. 15, 1925 |
| 1,691,135 | Schlaich | Nov. 13, 1928 |
| 1,751,632 | Hicks | Mar. 25, 1930 |
| 1,837,222 | Kannenstine | Dec. 22, 1931 |
| 1,970,819 | Reynolds | Aug. 21, 1934 |
| 2,184,689 | Savitz | Dec. 26, 1939 |
| 2,265,098 | Bettis | Dec. 2, 1941 |

OTHER REFERENCES

Publication, "Bureau of Mines Multiple-Diaphragm Recording Subsurface-Pressure Gage," Dept. of Interior Report R. I. 3291, November 1935.